(12) United States Patent
Urry

(10) Patent No.: US 9,245,329 B1
(45) Date of Patent: Jan. 26, 2016

(54) SYSTEM AND METHOD FOR GRAPHICS RENDERING USING A PROXIMITY TEST

(75) Inventor: Russell J. Urry, West Jordan, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2114 days.

(21) Appl. No.: 12/371,439

(22) Filed: Feb. 13, 2009

(51) Int. Cl.
*G09G 5/377* (2006.01)
*G06T 5/00* (2006.01)
*G06T 19/20* (2011.01)
*G06T 15/40* (2011.01)

(52) U.S. Cl.
CPC .............. *G06T 5/006* (2013.01); *G06T 15/405* (2013.01); *G06T 19/20* (2013.01)

(58) Field of Classification Search
CPC ........................................................ G06T 5/006
USPC ........................................................ 345/642
See application file for complete search history.

(56) References Cited

U.S. PATENT DOCUMENTS

| 2,930,035 | A | | 3/1960 | Altekruse |
|---|---|---|---|---|
| 2,965,894 | A | | 12/1960 | Sweeney |
| 2,994,966 | A | | 8/1961 | Senitsky et al. |
| 3,153,234 | A | | 10/1964 | Begeman et al. |
| 3,312,088 | A | | 10/1965 | Alexander et al. |
| 3,241,141 | A | | 3/1966 | Wall |
| 3,325,807 | A | | 6/1967 | Burns et al. |
| 3,373,423 | A | | 3/1968 | Levy |
| 3,397,397 | A | | 8/1968 | Barney |
| 3,739,380 | A | | 6/1973 | Burdic et al. |
| 3,815,132 | A | | 6/1974 | Case, Jr. et al. |
| 3,866,222 | A | | 2/1975 | Young |
| 4,654,665 | A | | 3/1987 | Kiuchi et al. |
| 4,760,396 | A | | 7/1988 | Barney et al. |
| 5,825,363 | A | * | 10/1998 | Anderson ...................... 345/422 |
| 5,867,166 | A | * | 2/1999 | Myhrvold et al. ............ 345/419 |
| 5,945,926 | A | | 8/1999 | Ammar et al. |
| 6,052,125 | A | * | 4/2000 | Gardiner et al. .............. 345/421 |
| 6,233,522 | B1 | | 5/2001 | Morici |
| 6,271,850 | B1 | * | 8/2001 | Kida et al. ...................... 345/422 |
| 6,278,799 | B1 | * | 8/2001 | Hoffman ........................ 382/159 |

(Continued)

OTHER PUBLICATIONS

Adams, Charlotte, "Synthetic Vision: Picturing the Future," *Avionics magazine, Solutions for Global Airspace Electronics*, Oct. 2006, cover and pp. 22-29.

(Continued)

*Primary Examiner* — Javid A Amini
(74) *Attorney, Agent, or Firm* — Angel N. Gerdzhikov; Donna P. Suchy; Daniel M. Barbieri

(57) ABSTRACT

A circuit renders computer graphics for an electronic display. The circuit includes a frame buffer to store a primitive for each pixel of the display, the primitive for each pixel being output to the display. The circuit includes a processor for storing the primitives in the frame buffer based on input primitives. The processor receives an input primitive in the same group as a corresponding stored primitive, determines whether the input primitive is within a threshold distance from the stored primitive, determines which of the input primitive and stored primitive is closer in depth to an observer of the display when the input primitive and the stored primitive are not within the threshold distance, and outputs the closer primitive to the frame buffer. The processor determines whether the input primitive and stored primitive has a higher priority when within the threshold distance and outputs the primitive with the higher priority.

20 Claims, 6 Drawing Sheets

(56) References Cited

U.S. PATENT DOCUMENTS

| | | | |
|---|---|---|---|
| 6,362,818 B1* | 3/2002 | Gardiner et al. | 345/421 |
| 6,388,607 B1 | 5/2002 | Woodell | |
| 6,424,288 B1 | 7/2002 | Woodell | |
| 6,512,527 B1 | 1/2003 | Barber et al. | |
| 6,603,425 B1 | 8/2003 | Woodell | |
| 6,690,298 B1 | 2/2004 | Barber et al. | |
| 6,744,430 B1* | 6/2004 | Shimizu | 345/420 |
| 6,799,095 B1 | 9/2004 | Owen et al. | |
| 7,023,375 B2 | 4/2006 | Klausing | |
| 7,026,956 B1 | 4/2006 | Wenger et al. | |
| 7,053,796 B1 | 5/2006 | Barber | |
| 7,057,549 B2 | 6/2006 | Block | |
| 7,064,680 B2 | 6/2006 | Reynolds et al. | |
| 7,098,913 B1 | 8/2006 | Etherington et al. | |
| 7,109,913 B1 | 9/2006 | Paramore et al. | |
| 7,116,333 B1* | 10/2006 | Peercy | 345/582 |
| 7,123,260 B2 | 10/2006 | Brust | |
| 7,180,476 B1 | 2/2007 | Guell et al. | |
| 7,191,406 B1 | 3/2007 | Barber et al. | |
| 7,352,292 B2 | 4/2008 | Alter et al. | |
| 7,375,678 B2 | 5/2008 | Feyereisen et al. | |
| 7,379,796 B2 | 5/2008 | Walsdorf et al. | |
| 2002/0158256 A1 | 10/2002 | Yamada et al. | |
| 2004/0222988 A1* | 11/2004 | Donnelly | 345/419 |
| 2005/0068313 A1* | 3/2005 | Morimitsu et al. | 345/419 |
| 2005/0140676 A1* | 6/2005 | Cho | 345/440 |
| 2007/0176928 A1* | 8/2007 | Matsumoto et al. | 345/427 |
| 2009/0128554 A1* | 5/2009 | Elsberg et al. | 345/419 |

OTHER PUBLICATIONS

Adams, Charlotte, "Synthetic Vision: Picturing the Future," *Avionics magazine*, Oct. 1, 2006, printed from website www.aviationtoday.com, 4 pages.

Blue Mountain Avionics' Products, printed from website www.bluemountainavionics.com on Aug. 28, 2007, 4 pages.

"MountainScope™ on a TabletPC," PCAvionics™, printed from website www.pcavionics.com on Aug. 28, 2007, 1 page.

"PCAvionics: Makers of MountainScope™, A New Dimension in Situational Awareness," PCAvionics™, printed from website www.pcavionics.com on Aug. 28, 2007, 1 page.

Pictures of DELPHINS, printed from website www.tunnel-in-the-sky.tudelft.nl on Aug. 28, 2007, 4 pages.

"TAWS Terrain Awareness and Warning System," Universal® Avionics, printed from website www.uasc.com on Aug. 28, 2007, 2 pages.

TAWS Class A and Class B, Terrain Awareness and Warning Systems, Universal® Avionics Systems Corporation, Sep. 2007, 6 pages.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Van Kasteren, Joost, :Tunnel-in-the-Sky, Synthetic vision simplifies the pilot's job and enhances safety, printed from website www.delftoutlook.tudelft.nl on Aug. 28, 2007, 13 pages.

U.S. Appl. No. 10/969,459, filed Oct. 19, 2004, Urry.

Catmull, E., "A Subdivision Algorithm for Computer Display of Curved Surfaces," Ph.D. Thesis, Department of Computer Science, University of Utah, Dec. 1974, 85 pages.

Foley et al., *Computer Graphics—Principles and Practice*, 2nd edition, 1995, entire book, Addison-Wesley Publishing Company, USA.

GL_SGIX_reference_plane, Open GL® Extension Registry, Mar. 1996, 18 pages, http://www.opengl.org/registry/, item 60 on the Vendor and EXT Extensions list.

Newell et al., "A Solution to the Hidden Surface Problem," Proceedings of the ACM National Conference, 1972, 16 pages.

Segal et al., "The OpenGL® Graphics System: A Specification," Version 1.4, Jul. 2002, 312 pages, Silicon Graphics, Inc.

Watkins, G.S., "A Real Time Visible Surface Algorithm," Ph.D. Thesis, Technical Report UTEC-CSc-70-101, NTIS AD-762 004, Computer Science Department, University of Utah, SLC, Utah, Jun. 1970, 96 pages.

Wylie et al., "Half-tone perspective drawings by computer," AFIPS Conference Proceedings, vol. 31, Fall Joint Computer Conference, Nov. 14-16, 1967, cover pages and pp. 49-58, Thompson Books, Washington DC.

\* cited by examiner

SYSTEM AND METHOD FOR GRAPHICS RENDERING USING A PROXIMITY TEST

CROSS-REFERENCE TO RELATED PATENT APPLICATIONS

This application is related to co-pending U.S. patent application Ser. No. 10/969,459, filed Oct. 19, 2004, the entirety of which is herein incorporated by reference.

BACKGROUND

The present disclosure relates generally to the field of computer graphics. The present disclosure relates more specifically to rendering computer graphics for an electronic display.

Before an image can be rendered by a computer graphics system, it is first modeled in a format that the computer can utilize. Modeling techniques and tools describe a virtual environment with primitives that can be rendered by the graphics hardware. Primitives are basic geometric shapes such as points, lines, or polygons, and so forth. These primitives can be stretched and rotated into any position, thus allowing the construction of complex forms.

Regardless of the method used to model the virtual environment, the graphics hardware (or software) converts the modeled primitives into an array of frame buffer pixels that can be drawn on a display device. This process of converting modeled primitives into visible pixels is known as rendering.

A part of the rendering process is known as hidden surface removal (or visual priority resolution). Hidden surface removal determines which primitives in the scene should be visible for any given pixel (or sub-pixel if anti-aliasing techniques are employed). Common hidden-surface-removal techniques include the painter's algorithm, list-priority algorithms, scan line algorithms, and Z buffering, which is also known as depth buffering.

Each of the hidden-surface removal techniques has distinct advantages and disadvantages. For various reasons, the depth buffer has now become a popular choice. Most of the other approaches require special modeling techniques and support structures in order to render the image properly. The depth buffer approach eliminates many of these constraints, thereby simplifying the modeling process. With a depth buffer, the visible surface at each pixel (or sub-pixel) is simply the primitive with the closest depth value for each pixel. Depth is defined as the distance from the viewpoint to the primitive. As each primitive is rendered, this depth parameter is computed for each pixel touched by the primitive. Along with storing the color of each pixel, a frame buffer can be expanded to also store the depth value. As each new primitive is processed, the new depth is compared with the one already in the frame buffer. The frame buffer then simply keeps whichever primitive is closest to the observer.

The depth buffer technique tends to break down for primitives that are coincident with each other. A primitive is considered to be coincident if it has substantially the same depth as another primitive, such as a stripe on a road or a door on a side of a building. Limited computing precision when specifying the position of primitives relative to one another makes it mathematically difficult to consistently compute which surface is on top based on depth alone. Various techniques have been developed to assist the depth buffer to correctly select which primitive is closer to the view point. These techniques include depth value scale/offset, reference planes, stencil buffer, etc. Each of these techniques complicates the basic depth buffer algorithm in some way. Most place restrictions on the rendering process such as handling the primitives in a specific order (fix-listing) or requiring additional information to accompany the primitives.

The basic depth buffer consists of a simple comparison between an incoming pixel's depth value and the value already stored in the depth buffer. The incoming pixel's address within the 2-dimensional array of pixels stored in the frame buffer is used to select which depth is compared with the incoming depth.

Since this simple test of comparing depth values cannot consistently resolve the visual priority of coincident primitives, various techniques have been developed to augment this simple test. Each of these techniques is based on two assumptions. First, the assumption that the modeler must specify the correct visual priority order of coincident primitives. Since the order cannot be computed, it must be defined. Second, the rendering process must correctly interpret and enforce that defined order.

The simplest method adjusts the primitive's depth value such that it is forced in front or behind another primitive based on its modeled priority. This adjustment is usually a simple scale or offset of the depth value to exaggerate its position. This technique, however, is not very consistent. Adjustment values that work correctly for some primitives in the scene may not adjust other primitives far enough to be correctly resolved. In addition, other primitives in the scene may be moved too far and move in front of scene elements they are supposed to be behind.

Stencil buffering is a technique that provides a second value besides depth that can be independently stored and tested in conjunction with the depth test. A stencil value is assigned to a group of coincident primitives. The primitives of the group with the highest visual priority are rendered first. At each pixel where they win the depth test, they also store the group's stencil value in the stencil buffer. When subsequent primitives of the group with lower visual priority are rendered, they test the stencil buffer as well as the depth buffer. If the stencil value matches, meaning the pixel was previously claimed by a higher priority primitive of the group, the incoming lower priority primitive is discarded. If the stencil value does not match, then the simple depth test alone is used.

While this technique is useful, it relies on the primitives being rendered in a fixed order to correctly resolve the visual priority. There are also restrictions relative to the management of the stencil buffer such that multiple different coincident groups within the scene do not conflict.

In addition, most of these coincident primitive extensions are not completely compatible with advanced depth reduction techniques in use. For instance, the techniques may require rendering the primitives in a back-to-front order. Others require all of the pixels of all of the primitives to be rendered. This incompatibility reduces or eliminates the benefits associated with these advanced techniques when coincident primitives are rendered.

What is needed is a system and method for assisting the depth buffer to correctly select which primitive is closer to the view point without overly complicating the algorithm. What is also needed is a system and method for assisting the depth buffer to correctly select which primitive is closer to the view point with greater consistency. What is further needed is a system and method for assisting the depth buffer to correctly select which primitive is closer to the view point while allowing primitives to be rendered in any order. What is further needed is a system and method for assisting the depth buffer to correctly select which primitive is closer to the view point without imposing modeling restrictions or forcing unique requirements on the rendering process for coincident primitives.

SUMMARY

One embodiment of the disclosure relates to a circuit configured to render computer graphics for an electronic display. The circuit comprises a frame buffer configured to store a primitive for each pixel of the electronic display, the primitive for each pixel being output to the electronic display device. The circuit further includes a processor configured to store the primitives in the frame buffer based on input primitives. The processor receives an input primitive in the same coincident group as a corresponding stored primitive, determines whether the input primitive is within a threshold distance from the stored primitive, determines which of the input primitive and stored primitive is closer in depth to an observer of the electronic display when the input primitive and the stored primitive are not within the threshold distance, and outputs the closer primitive to the frame buffer. The processor determines which of the input primitive and stored primitive has a higher priority when the input primitive and the stored primitive are within the threshold distance and outputs the primitive with the higher priority to the frame buffer.

Another embodiment of the disclosure relates to a method for rendering computer graphics for an electronic display. The method comprises receiving an input primitive in the same coincident group as a corresponding primitive stored in a frame buffer. The method further comprises determining whether the input primitive is within a threshold distance from the stored primitive using a processor. The method further comprises determining which of the input primitive and stored primitive is closer in depth to an observer of the electronic display when the input primitive and the stored primitive are not within the threshold distance using the processor. The method further comprises determining which of the input primitive and stored primitive has a higher priority when the input primitive and the stored primitive are within the threshold distance using the processor. The method further comprises outputting the closer primitive or the primitive with the higher priority to the frame buffer.

Yet another embodiment of the disclosure relates to an apparatus for rendering computer graphics for an electronic display. The apparatus comprises means for receiving an input primitive in the same coincident group as a corresponding primitive stored in a frame buffer, means for determining whether the input primitive is within a threshold distance from the stored primitive, means for determining which of the input primitive and stored primitive is closer in depth to an observer of the electronic display when the input primitive and the stored primitive are not within the threshold distance, means for determining which of the input primitive and stored primitive has a higher priority when the input primitive and the stored primitive are within the threshold distance, and means for outputting the closer primitive or the primitive with the higher priority to the frame buffer.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
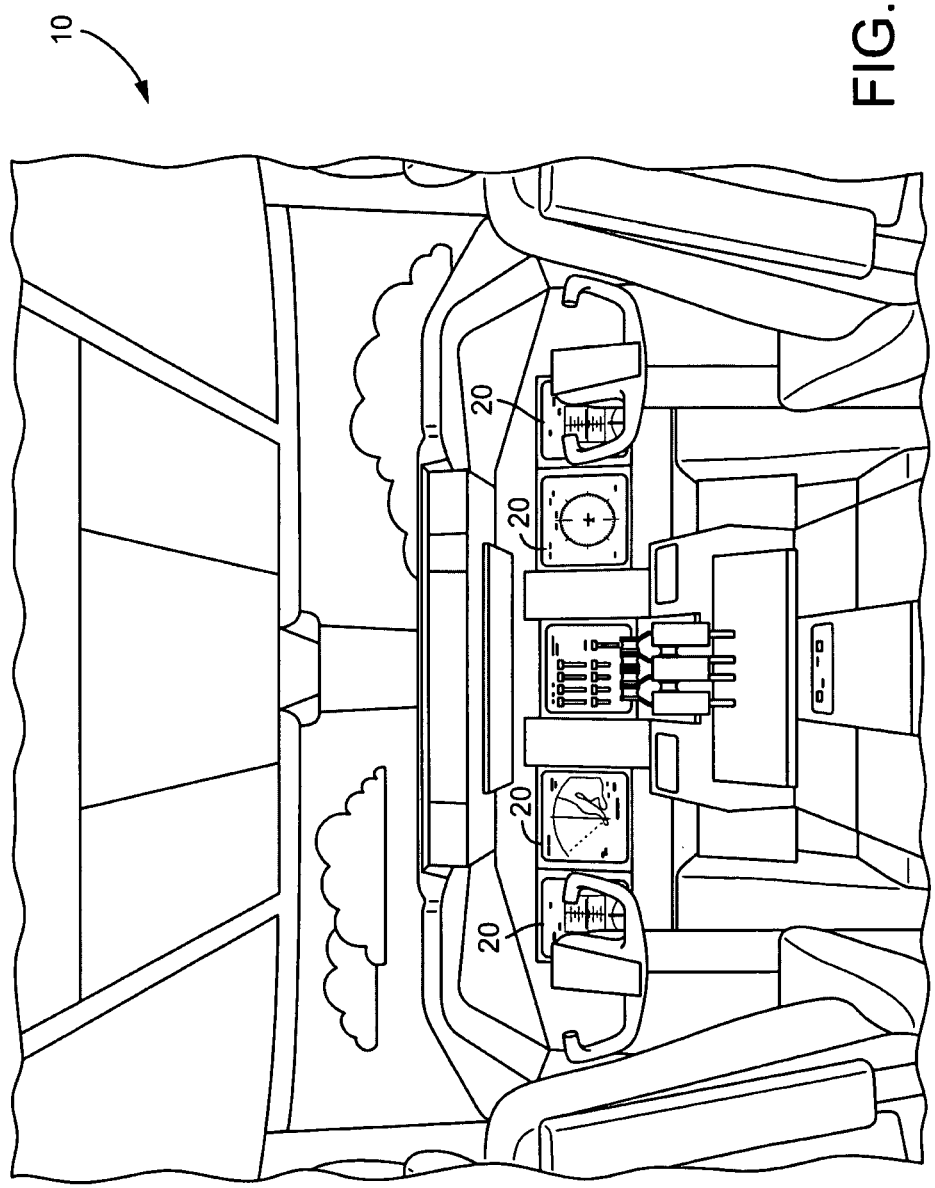
FIG. 1 is an environment view of an aircraft with an electronic display, according to an exemplary embodiment.

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, systems and methods for rendering computer graphics for an electronic display are described. More specifically, systems and methods for using various tests to resolve a visual priority for primitives to be rendered for an electronic display are described. Before an image is shown on an electronic display, the image is modeled in a format that may be interpreted by the user. Primitives (e.g., polygons, lines, points, etc.) may be used to describe the environment in the image and the primitives may be rendered for display on the electronic display. The primitives may be rendered in any order relative to each other to create an accurate replication on the electronic display.

A modeler (or other circuitry configured to render computer graphics) can define the visual priority relationship of coincident primitives without respect to rendering order. When creating a scene for display on an electronic display, a modeler can classify the geometric primitives of a scene into one of two different types relative to visual priority. First, geometric primitives can be classified into an ordinary group if the visual priority of the primitives can be resolved by the depth test alone. Second, all geometric primitives in a scene that are coincident to another primitive or primitives, such as a stripe on a road or a door on a building, are assigned to one or more unique coincident groups.

Each coincident group can be a collection of primitives that form layers on a surface or set of surfaces. For example, a single plane is a simple surface. Polygon models, cubes, cylinders, spheres, and other surfaces such as a terrain skin are also possible. The shapes may be either concave, convex, or any combination of both. Multiple surfaces can share a common coincident group designation as long as the multiple surfaces do not intersect. For example, two buildings, each with coincident door and window primitives can be assigned to the same coincident group since the two buildings do not occupy the same space in the environment being modeled.

Each coincident group can be assigned a unique group value. Each coincident primitive can also be assigned a layer value to define its visual priority relative to the other coincident primitives in the same coincident group. Coincident primitives within a given group rely on the simple depth test to resolve between coincident primitives of other groups and ordinary primitives in the scene. Therefore, each primitive within a scene has a visual depth set including at least three values. All primitives may have a depth value. This depth value is uniquely computed for each pixel touched by the primitive. A group value may be assigned to primitives in the coincident group. The group value comprises a specified number that is unique from every other group in the scene. This number is common to all coincident primitives within the same group. According to one exemplary embodiment, for ordinary primitives, the group value may be set to zero. A layer value may be assigned to primitives in the coincident group. Primitives on each layer of a coincident group may be assigned a layer value in visual priority order. For example, layer 0 may have the lowest priority and layer n may have the highest priority. For ordinary primitives, this value can be ignored, but can be set to zero for the purpose of consistency. In this embodiment, the contents of the frame buffer can be extended from storing just color and depth at each pixel to also storing the group and layer value.

The rendering order-independence feature of groups and layers works in a more beneficial manner when primitives with the same layer number within a given group do not overlap. If overlapping primitives do share the same layer number, rendering order then determines the final visual priority. Such circumstances may produce inconsistent visual results and overlapping is best avoided. Primitives which share the same layer number can be clipped to eliminate overlapping regions. Alternatively, if the primitive cannot be clipped then the coincident group may be fixed-listed to guarantee consistent rendering order.

Referring to FIG. 1, an illustration of an aircraft control center or cockpit 10 of an aircraft is shown, according to one exemplary embodiment. Aircraft control center 10 includes flight displays 20 which are used to increase visual range and to enhance decision-making abilities. In an exemplary embodiment, flight displays 20 may provide a rendered image from the systems and methods of the present disclosure. According to an exemplary embodiment, the systems and methods of the present disclosure may be used for a flight display of an aircraft; according to various other exemplary embodiments, the systems and methods of the present disclosure may be used by any system in any other embodiment for rendering computer graphics and displaying an output, (e.g., in another aircraft, a space vehicle, a ground vehicle, or in a non-vehicle application, etc.).

Figure 2A:
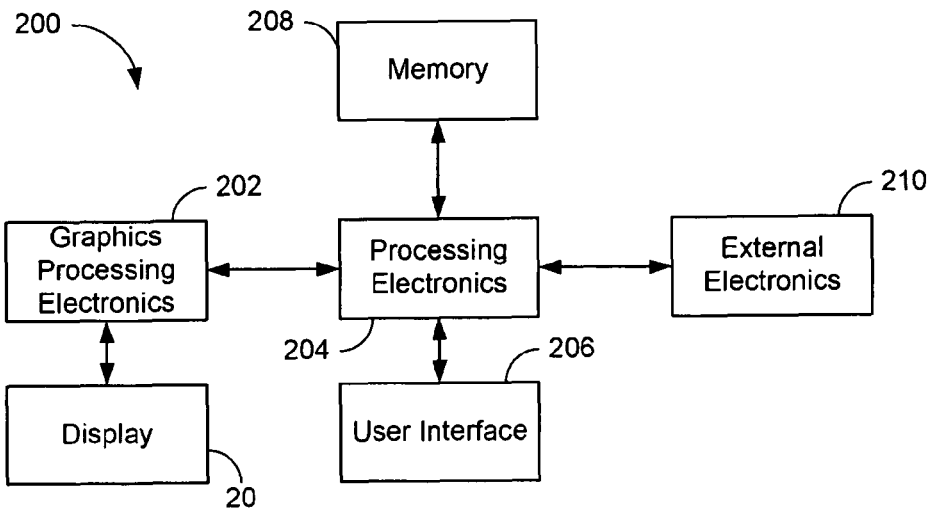
FIG. 2A is a block diagram of a system for rendering computer graphics for the electronic display of FIG. 1, according to an exemplary embodiment.

Referring now to FIG. 2A, a block diagram of a system 200 for rendering computer graphics on an electronic display is shown, according to an exemplary embodiment. System 200 includes processing electronics 204 which may include a microprocessor, an application specific integrated circuit (ASIC), a circuit containing one or more processing components, a group of distributed processing components, or other hardware configured for processing. Processing electronics 204 may generally be coupled to graphics processing electronics 202 and provide graphics processing electronics 202 with an input for rendering on display 20. Graphics processing electronics 202 is shown in greater detail in FIG. 2B.

System 200 additionally includes a user interface 206 and memory 208 coupled to processing electronics 204. User interface 206 may be any tactile interface or voice command interface configured to receive user commands for processing by processing electronics 204. Memory 208 can be any volatile or non-volatile memory capable of storing information used by electronics 204. According to various other exemplary embodiments, processing electronics 204 may include memory 208 internally or processing electronics 204 may include an internal memory and may communicate with external memory 208. System 200 additionally includes external electronics 210. External electronics 210 may include a GPS device that provides global positioning information from satellites, a radar antenna that receives terrain, weather, obstacle, or other information, a wireless transceiver that receives graphical information from a remote source (e.g., air traffic control, ground radar, another aircraft or vehicle, the Internet, etc.), another local computing system, etc. External electronics 210 may further include various systems of aircraft 10 (e.g., a radar system, a communication system, etc.) for use by system 200.

Display 20 may be any electronic display capable of representing the rendering received from graphics processing electronics 202 as a graphical image. Display 20 may be of any past, present, or future technology (e.g., LCD, DLP, plasma, CRT, TFT, calligraphic display, etc.), configuration (e.g., portrait, landscape, or other), or shape (e.g., polygonal, curved, curvilinear).

Figure 2B:
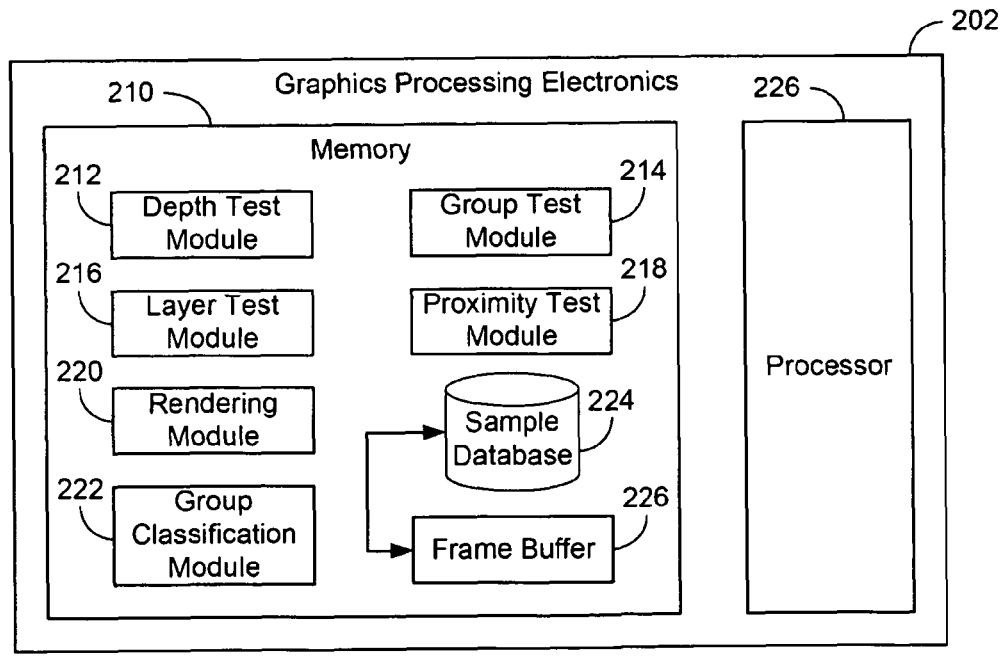
FIG. 2B is a detailed block diagram of the graphics processing electronics of the system of FIG. 2A, according to an exemplary embodiment.

Graphics processing electronics 202 is coupled to processing electronics 204 and may receive an input for rending a computer image on display 20. Referring now to FIG. 2B, graphics processing electronics 202 is shown in greater detail, according to an exemplary embodiment. Graphics processing electronics 202 may be generally configured to perform the tests and methods as described in the present disclosure. Electronics 202 includes a memory 210 and processor 226. Processor 206 may include a microprocessor, an application specific integrated circuit (ASIC), a circuit containing one or more processing components, a group of distributed processing components, or other hardware configured for processing.

Memory 210 may include several modules for executing the tests and methods of the present disclosure. Memory 210 includes a depth test module 212 configured to receive an input depth value and to compare the value to a specified depth value stored in frame buffer 226. Memory 210 further includes a group test module 214 configured to receive an input group value. Group test module 214 may include logic for determining if the received group value is equal to zero and/or if the received group value is equal to a specified group value stored in frame buffer 226. Memory 210 further includes a layer test module 216 configured to receive an input layer value and to compare the value to a specified layer value stored in frame buffer 226. Memory 210 further includes a proximity test module 218 configured to determine if a received depth value is within a threshold distance away from a specified depth value stored in sample frame buffer 226.

Memory 210 further includes a rendering module 220 configured to render primitives for an output to display 20. Memory 210 further includes a group classification module 222 configured to classify primitives into a group. Memory 210 further includes a sample database 224 configured to store information for samples (e.g., primitives) associated with the computer image to be rendered. For example, sample database 224 may include a depth value, group value, and layer value for each received primitive. Sample database 224 may be configured to receive primitive data from system 200.

Memory 210 further includes a frame buffer 226. The various modules 212-218 may use the values stored in frame buffer 226 to execute various comparison tests between the stored values and values received by modules 212-218. Frame buffer 226 may be generally configured to store a primitive and primitive information for each pixel as received from processing electronics 204 or elsewhere from system 200. For example, processing electronics 204 may be coupled to frame buffer 226 and may be configured to store primitives in frame buffer 226 based on the input primitives received. Frame buffer 226 may be coupled to sample database 224 or another component for storing or reading primitive information.

Figure 3A:
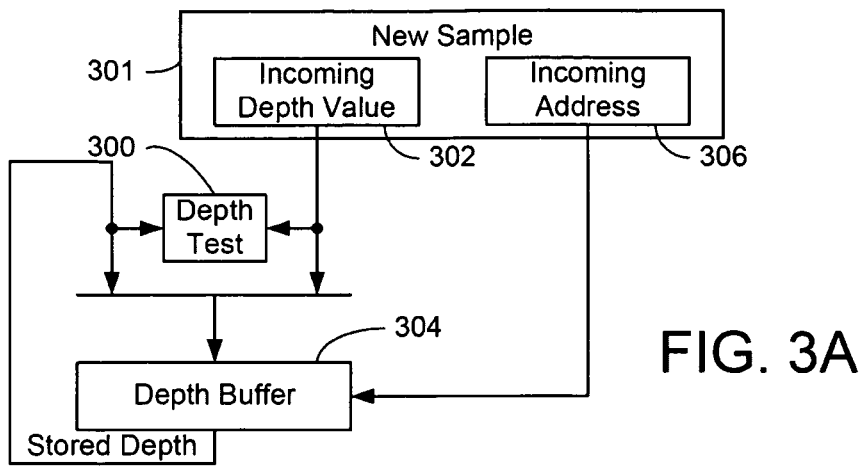
FIGS. 3A-C are block diagrams of tests used for rendering computer graphics for an electronic display, according to exemplary embodiments.
Figure 3B:
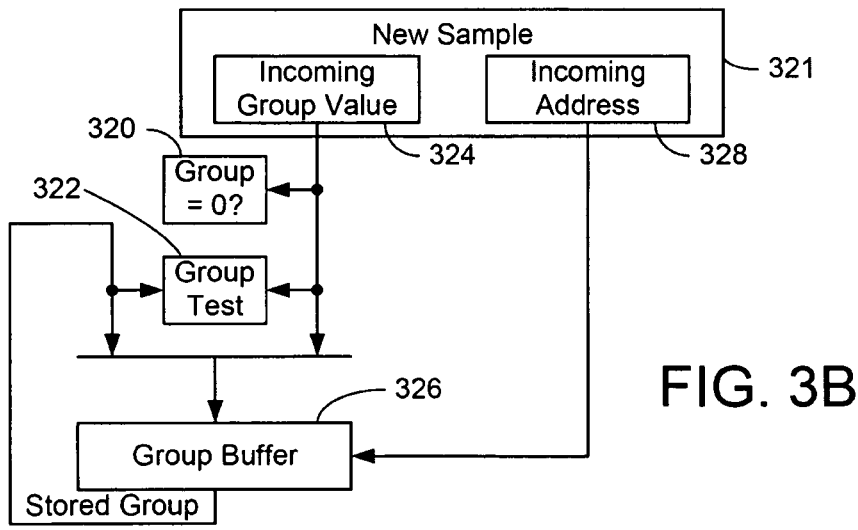
Figure 3C:
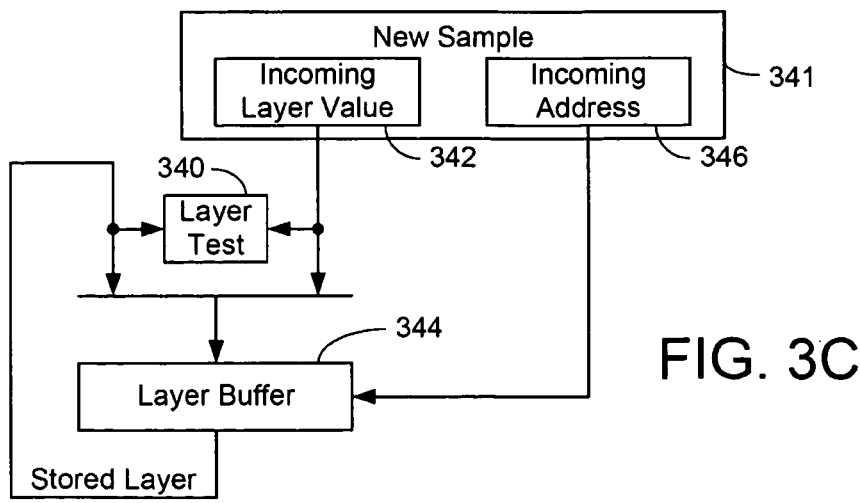

A basic visual priority test may be performed on each primitive's visual depth set, as shown in the tests illustrated in FIGS. 3A-C. The priority test may include comparisons of the depth, group, and layer values of an incoming primitive, pixel, or sub-pixel with a previously stored primitive, pixel, or sub-pixel. The values may be tested independently and the results may be combined to correctly resolve the order in which the primitives are displayed on the electronic display.

FIG. 3A is a block diagram of a depth test 300, according to an exemplary embodiment. Depth test 300 may be executed by depth test module 212, according to an exemplary embodiment. A new sample 301 including a depth value 302 and incoming address 306 may be provided to depth test 300. In depth test 300, incoming depth value 302 may be sent to incoming address 306 in depth buffer 308 to be compared with the stored depth value at the same address. If the primitive with incoming depth value 302 is closer to the viewpoint than the stored depth value in depth buffer 304, incoming depth value 302 may replace the stored depth value in depth buffer 304.

FIG. 3B is a block diagram of a group zero test 320 and a group test 322, according to an exemplary embodiment. Group zero test 320 and group test 322 may be executed by group test module 214, according to an exemplary embodiment. A new sample 321 including a group value 324 and incoming address 328 may be provided to group zero test 320. Group zero test 320 may be used to determine the difference between ordinary and coincident primitives. A primitive with a group value equal to zero is a member of the ordinary group of primitives and may be rendered in accordance with depth test 300 of FIG. 3A. Referring now to group test 322 (e.g., a group equal test), incoming group value 324 may be sent to incoming address 328 in the group buffer 326 to be compared with the stored group value at the same address.

According to another exemplary embodiment, a primitive may not have a group number or a default group number may be assigned, and group zero test 320 may be a test to determine if the primitive does not have a group number or if the primitive has the default group number.

FIG. 3C is a block diagram of a layer test 340, according to an exemplary embodiment. Layer test 340 may be executed by layer test module 216, according to an exemplary embodiment. A new sample 341 including a layer value 342 and incoming address 346 may be provided to layer test 340. Incoming layer value 342 may be sent to incoming address 346 in the layer buffer 344 to be compared with the stored layer value at the same address in layer buffer 344 to determine whether the primitive with incoming layer value 342 has a higher priority than the stored layer value. According to one exemplary embodiment, the priority may be defined such that zero represents the lowest priority and a value n represents the highest priority, wherein n is the maximum value supported by the representation of the layer value.

Figure 4:
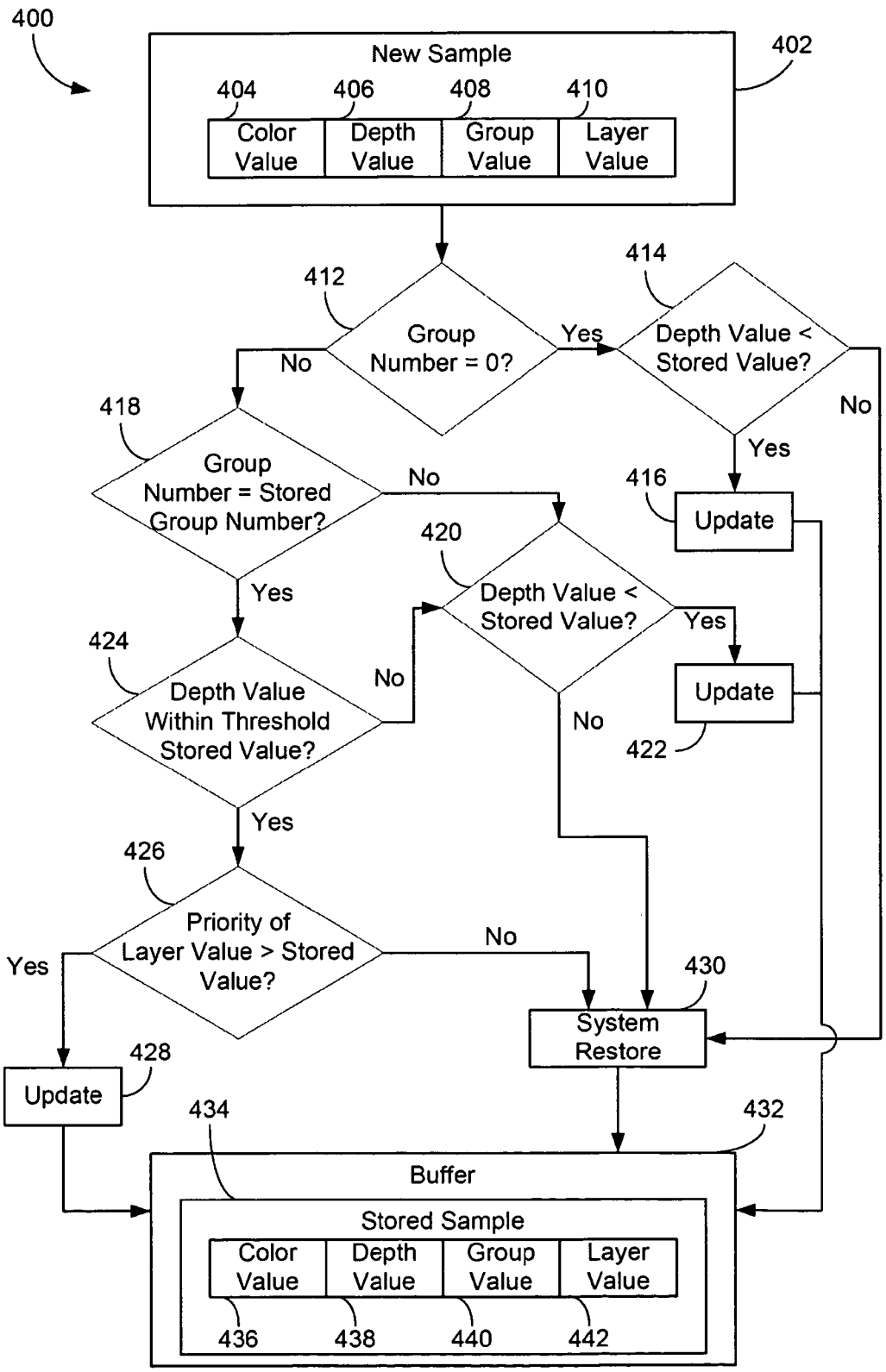
FIG. 4 is a flow chart of a process of resolving visual priority rendering among coincident primitives using the tests of FIGS. 3A-C and a proximity test, according to an exemplary embodiment.

The various tests of FIGS. 3A-C may be combined and used as part of process 400 of FIG. 4. A new sample 402 is shown to include a color value 404, a depth value 406, a group value 408, and a layer value 410. Values 404-410 of sample 402 may be generally compared with a stored sample 434 and its corresponding color value 436, depth value 438, group value 440, and layer value 442. Stored sample 434 may be located at an address in buffer 432. According to an exemplary embodiment, group value 408 of each sample 402 of the input primitive may be based on whether a point or surface of the primitive is coincident with surfaces or points of other primitives using the processing electronics. For example, multiple surfaces can share a group value 408 is the surfaces do not intersect (e.g., primitives for two different objects that do not intersect may be assigned the same group value 408). Processing electronics may be used to make the group value assignment (e.g., via group classification module 222), according to an exemplary embodiment.

New sample 402 may be tested using a group zero test 412 (e.g., group zero test 320 of FIG. 3B) to determine if group value 408 is equal to zero. If group value 408 is equal to zero, the primitive is ordinary and a depth test 414 (e.g. depth test 300 of FIG. 3A) may be used to determine if depth value 406 of new sample 402 is closer to the viewpoint (or eye-point) than depth value 438 of stored sample 434.

If depth value 406 is closer, an update 416 may be performed and color value 404 and depth value 406 may be entered into buffer 432 to replace color value 436 and depth value 438, while group value 440 and layer value 442 may be set to zero. A new sample may then be tested. If depth value 406 is not closer, a system restore step 430 may be performed to retain the current and original values stored in buffer 432, and a new sample may then be tested.

If group zero test 412 determined group value 408 is not equal to zero, a group equal test 418 (e.g., group test 322 of FIG. 3B) may be performed to determined if group value 408 is equal to group value 440 of stored sample 434. If the group values are not equal, a depth test 420 (e.g., depth test 300 of FIG. 3A) may be used to determine if depth value 406 of new sample 402 is closer to the viewpoint (or eye-point) than depth value 438 of stored sample 434. If depth value 406 is closer, an update 422 may be performed and values 404-410 may be entered into buffer 432 to replace values 436-442. A new sample may then be tested. If depth value 406 is not closer, a system restore step 430 may be performed to retain the current and original values stored in buffer 432, and a new sample may then be tested.

If group equal test 418 determines the group values are equal, the incoming and stored primitives are members of the same coincident group and further tests are necessary to resolve visual priority. A proximity test 424 may be used. Proximity test 424 may determine if depth value 406 of new sample 402 is within a threshold distance away from depth value 438 of stored sample 434. If not, depth test 420 may be used as described. If depth value 406 is within the threshold, layer test 426 may be used. Proximity test 424 is described in greater detail in FIG. 6.

If depth value 406 is within the threshold, the incoming and stored primitives are considered coincident and a layer test 426 (e.g., layer test 340 of FIG. 3C) may be performed to determine whether layer value 410 of new sample 402 is of a higher priority than layer value 442 of stored sample 434. If layer value 410 is of a lower priority than layer value 442, system restore step 430 may be performed to retain the current and original values stored in buffer 432, and a new sample may then be tested. If layer value 410 is of a higher priority than layer value 442, an update 428 may be performed and values 404-410 may be entered into buffer 432 to replace values 436-442.

Figure 5:
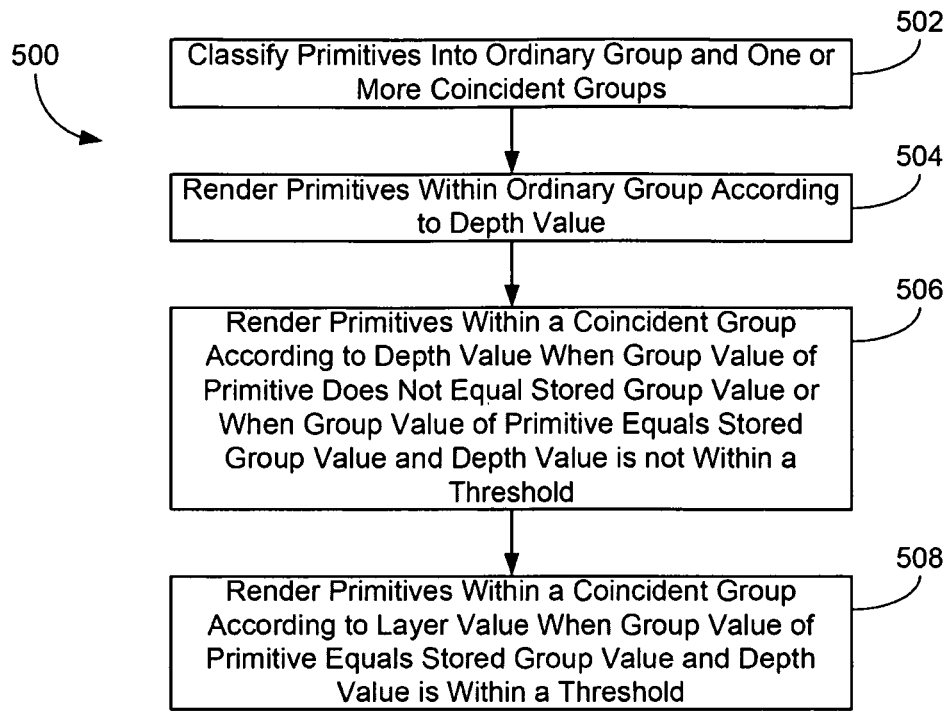
FIG. 5 is a flow chart of a process for resolving visual priority rendering among coincident primitives, according to an exemplary embodiment.

Referring now to FIG. 5, a flow chart of a process 500 for resolving visual priority among coincident primitives is shown, according to an exemplary embodiment. Each primitive of a computer generated scene is assigned a visual depth set consisting of a depth value, a group value, and a layer value. Each primitive may be classified into an ordinary group or one of multiple coincident groups (step 502). Primitives placed in the ordinary group may be assigned a group value of zero. Other primitives placed in coincident groups may be assigned a nonzero group value based on the unique group of which they are a part. The visual depth set for each primitive can be stored in a separate specific location. For example, the pixels composing the primitive may be stored in an m by n location in a two-dimensional frame buffer (wherein m and n represent height and width of the scene). Incoming visual depth sets (e.g., new samples such as sample 402 of FIG. 4) of a primitive may then be compared with a stored visual depth set (e.g., sample 434 of FIG. 4) of a primitive, wherein the stored primitive is located at the same specific location as the incoming primitive in the computer generated scene.

Primitives within the ordinary group may be rendered according to depth value (step 504). A depth test (e.g., depth test 300 of FIG. 3A) may be used to resolve which primitive is visible. Primitives within a coincident group may be rendered according to depth value when the group value of the primitives does not equal the stored group value or when the primitive's group value equals the stored group value but the depth value is not within a threshold of the stored depth value (step 506). A depth test may be used to resolve which primitive is visible. Primitives may also be rendered according to a layer test (e.g., layer test 340 of FIG. 3C) when the group value of a primitive in the coincident group is equal to a stored group value and the depth value is within a threshold of the stored depth value (step 508).

Process 500 may be applied for higher level of abstractions. For example, process 500 may be applied to pixel arrays instead of just pixels, sub-pixels, or other types of primitives.

Figure 6:
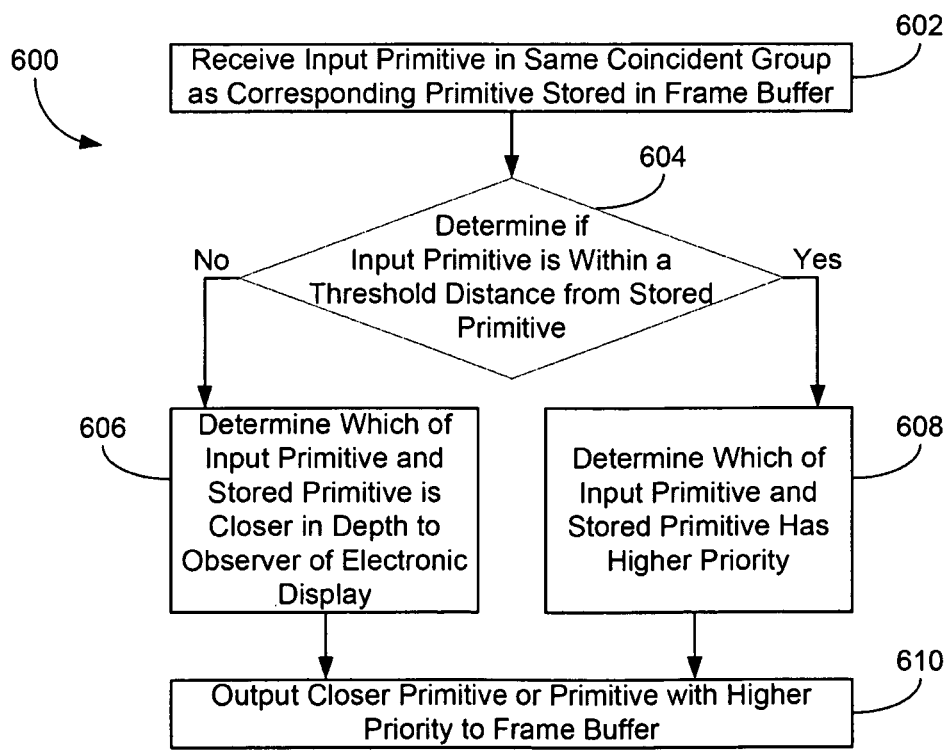
FIG. 6 is a flow chart of a process for using a proximity test in the process of FIG. 4, according to an exemplary embodiment.

Referring now to FIG. 6, a flow chart of a process 600 for using a proximity test in the embodiment of FIG. 4 is shown, according to an exemplary embodiment. The proximity test includes receiving an input primitive which belongs to the same coincident group as the primitive stored in the frame buffer (e.g., buffer 432 of FIG. 4) (step 602).

A determination may be made as to if the depth value of the input primitive is within a threshold distance away from the depth value of the stored primitive (step 604). The threshold distance may be based on how closely coincident primitives are modeled relative to a shared common surface, according to an exemplary embodiment. The threshold distance may additionally be based on a slope of the input primitive as viewed in perspective by an observer of the electronic display. Step 604 is used to determine whether a depth test or layer test should be used for primitives that belong to the same coincident group.

If the depth value is not within the threshold distance, a depth test may be used. Process 600 may determine which of the input primitive and stored primitive is closer in depth to an observer of the electronic display (step 606) and may generally follow steps 420-422 and 430 as described in FIG. 4. If the depth value is within the threshold distance, a layer test may be used. Process 600 may determine which of the input primitive and stored primitive has a higher priority (step 608) and may generally follow steps 428-430 as described in FIG. 4. Process 600 may output the closer primitive or primitive with the higher priority to the frame buffer (step 610).

Primitives received and rendered according to process 500 or process 600 may be done so in any order. The order that the primitives are rendered does not impact the image generated on the electronic display based on the frame buffer. The electronic display may display an image based on input from the frame buffer.

Figure 7A:
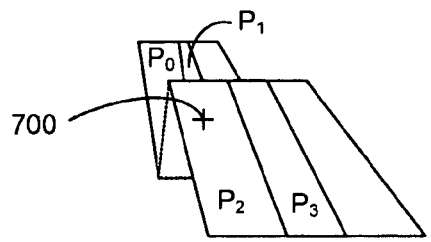
FIGS. 7A-E are examples of using the systems and methods of FIGS. 3-6 to render computer graphics on an electronic display, according to an exemplary embodiment.
Figure 7B:
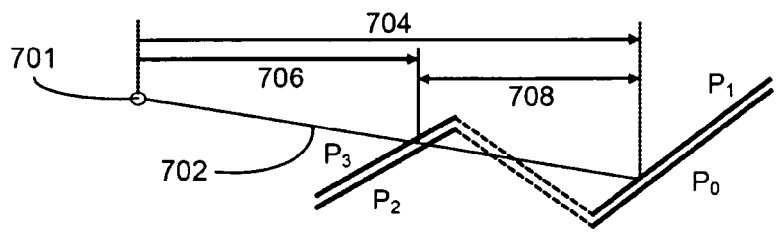

Referring generally to FIGS. 7A-E, examples of using the systems and methods of the present disclosure to render computer graphics on an electronic display are shown. In the embodiments of FIG. 7A-B, a road and surrounding terrain are shown. $P_1$ and $P_3$ may be primitives that represent a road and the area "below" and around the road (e.g., a terrain facet) may be represented by the primitives denoted as $P_0$ and $P_2$. A pixel location 700 is illustrated in FIG. 7A. Pixel location may be "touched" by three primitives in the example of FIG. 7A: primitive $P_0$, primitive $P_1$, and primitive $P_2$. Primitives $P_0$, $P_1$, and $P_2$ are part of a single coincident group and thus share a common group value. As shown in the side view of FIG. 7B, the primitives ($P_1$ and $P_3$) representing the road lie on top of and are thus given a higher priority layer number than the other primitives ($P_0$ and $P_2$). Eyepoint 701 represents the view that a user of the electronic display has such that the user is viewing the angle of the drawing shown in FIG. 7A. Sightline 702 illustrates the view that the user has of the drawing (e.g., the point at where sightline 702 intersects the drawing is at pixel location 700). Depth 704 represents the depth from eyepoint 701 to an intersection point with $P_1$ and $P_0$, depth 706 represents the depth from eyepoint 701 to an intersection point with $P_2$ (e.g., pixel location 700), and depth 708 represents the depth difference between depths 704 and 706.

Suppose the primitives are drawn in the order of $P_0$, $P_1$, $P_2$, $P_3$ ... $P_0$ is drawn first and the primitive is stored in the frame buffer as described in process 400 of FIG. 4 at depth 704. $P_1$ may be rendered next and is also at essentially depth 704. The difference in the depths of $P_1$ and $P_0$ is smaller than a threshold distance and the result of the proximity test causes the layer test to be used. Since $P_1$ has a higher priority layer value, $P_1$ replaces $P_0$ in the frame buffer as described in process 400. $P_2$ may then be rendered. Using the proximity test (with the difference depth 708 being larger than a threshold distance), the depth test may then be invoked as described in process 400, and $P_2$, being closer, is stored in the frame buffer in place of $P_1$. The final rendered image may then be drawn as shown in FIG. 7A with the correct visual priority.

Figure 7C:
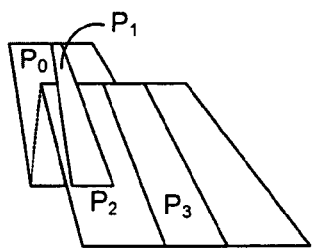

FIG. 7C illustrates the imagine of FIG. 7A drawn with an incorrect visual priority. In the embodiment of FIG. 7C, for example, if the proximity test is skipped, $P_2$ is determined to have the same group value but a lower priority layer value, and $P_1$ may retain priority over $P_2$ and be drawn over $P_2$, creating an inaccurate rendering of the image.

Figure 7D:
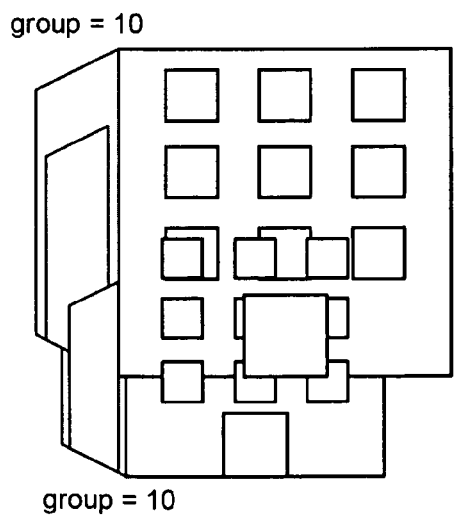
Figure 7E:
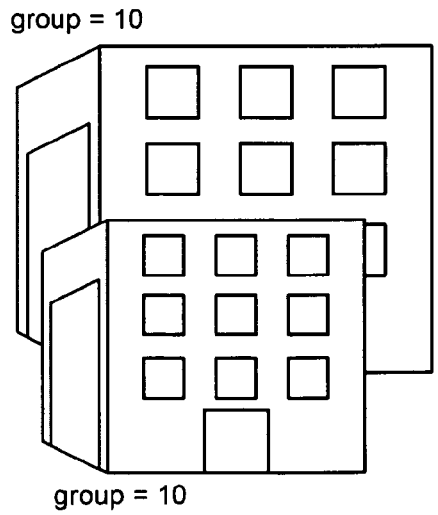

According to an exemplary embodiment, the final result illustrated in FIG. 7A, using process 400 and the other systems and methods of the present disclosure, may allow all of the primitives ($P_0$, $P_1$, $P_2$, $P_3$) to be rendered in any order and still maintain the correct visual priority. Referring also to FIGS. 7D-E, the use of the proximity test reduces the number of unique coincident groups required within a scene. In the embodiment of FIG. 7D, both buildings may be assigned the same group number (10) but may be rendered improperly without the use of a proximity test. According to various embodiments (e.g., one such embodiment as disclosed in patent application Ser. No. 10/969,459), if the rendering process does not include proximity test 424, the buildings may be rendered improperly as shown in FIG. 7D.

In the embodiment of FIG. 7E, both buildings may be assigned the same group number (10), but the use of proximity test 424 identifies the door and window primitives of one of the buildings to be within a threshold distance of that building but outside the threshold distance of the other building, resulting in a correct rendering of the buildings.

The present invention provides a unified method of specifying both ordinary and coincident primitives (group and layer) such that special case handling can be eliminated. The present invention provides a simpler and more general method to correctly resolve the visual priority of coincident primitives. The modeler has more flexibility by being able to consider elements within the synthetic environment on both a global (group) and local (layer) level when producing the definition of visual priority. The rendering process is simplified by reducing the complexity of the operations required to correctly and consistently interpret the intended visual priority of complex models specified by the modeler.

The present invention provides the ability to do more complex comparisons to ease or remove many of the restrictions and special cases of existing hidden surface removal methods relating to coincident primitives. It also simplifies the work of rendering software that interprets the model and drives the rendering process because grouping and layering are embedded in the model and do not require special interpretation.

It is to be understood that the above-referenced arrangements are illustrative of the application for the principles of the present invention and disclosure. It will be apparent to those of ordinary skill in the art that numerous modifications can be made without departing from the principles and concepts of the invention as set forth in the claims.

What is claimed is:

1. A circuit configured to render computer graphics for an electronic display, comprising:
    a frame buffer configured to store a primitive for each pixel of the electronic display, the primitive for each pixel being output to the electronic display device; and
    a processor configured to store the primitives in the frame buffer based on input primitives, the processor receiving an input primitive in the same coincident group as a corresponding stored primitive, the processor determining whether the input primitive is within a threshold distance from the stored primitive, the processor determining which of the input primitive and stored primitive is closer in depth to an observer of the electronic display when the input primitive and the stored primitive are not within the threshold distance and outputting the closer primitive to the frame buffer, the processor determining which of the input primitive and stored primitive has a higher priority when the input primitive and the stored primitive are within the threshold distance and outputting the primitive with the higher priority to the frame buffer.

2. The circuit of claim 1, wherein the processor is part of processing electronics, the processing electronics determining which of the input primitive and stored primitive is closer in depth to an observer of the electronic display when the input primitive does not have a group number or has a default group number and outputs the closer primitive to the frame buffer.

3. The circuit of claim 2, wherein the processing electronics receives a second input primitive that is not in the same coincident group as a corresponding stored primitive, the processing electronics determining which of the second input primitive and corresponding stored primitive is closer in depth to an observer of the electronic display and outputting the closer primitive to the frame buffer.

4. The circuit of claim 3, wherein the processing electronics receives and renders additional input primitives and the order in which the primitives are rendered does not impact the image generated on the electronic display based on the frame buffer.

5. The circuit of claim 4, wherein the processing electronics assigns a group value to each input primitive based on whether a point or surface of the primitive is coincident with surfaces or points of other primitives.

6. The circuit of claim 1, wherein outputting a primitive to the frame buffer comprises restoring the original contents of the frame buffer or updating at least one of color, depth, group, and layer information of the primitive.

7. The circuit of claim 1, wherein the threshold distance is based on how closely coincident primitives are modeled relative to a common surface they share.

8. The circuit of claim 7, wherein the threshold distance is also based on a slope of the perspective of an image presented to the observer on the electronic display.

9. The circuit of claim 1, wherein the frame buffer is configured to store information related to depth, group, and layer of each primitive.

10. A method for rendering computer graphics for an electronic display, comprising:
    receiving an input primitive in the same coincident group as a corresponding primitive stored in a frame buffer;
    determining whether the input primitive is within a threshold distance from the stored primitive using a processor;
    determining which of the input primitive and stored primitive is closer in depth to an observer of the electronic display when the input primitive and the stored primitive are not within the threshold distance using the processor;
    determining which of the input primitive and stored primitive has a higher priority when the input primitive and the stored primitive are within the threshold distance using the processor; and
    outputting the closer primitive or the primitive with the higher priority to the frame buffer in response to the input primitive being within the threshold distance or not within the threshold distance.

11. The method of claim 10, further comprising:
    determining which of the input primitive and stored primitive is closer in depth to an observer of the electronic display using the processor when the input primitive does not have a group number or has a default group number; and
    outputting the closer primitive to the frame buffer,
    wherein the processor is part of processing electronics.

12. The method of claim 11, further comprising:
    receiving a second input primitive that is not in the same coincident group as a corresponding stored primitive;
    determining which of the second input primitive and corresponding stored primitive is closer in depth to an observer of the electronic display using the processing electronics; and
    outputting the closer primitive to the frame buffer.

13. The method of claim 12, further comprising:
    receiving and rendering additional input primitives using the processing electronics,
    wherein the order in which the primitives are rendered does not impact the image generated on the electronic display based on the frame buffer.

14. The method of claim 13, further comprising:
    assigning a group value to each input primitive based on whether a point or surface of the primitive is coincident with surfaces or points of other primitives using the processing electronics.

15. The method of claim 10, wherein outputting a primitive to the frame buffer comprises restoring the original contents of the frame buffer or updating at least one of color, depth, group, and layer information of the primitive.

16. The method of claim 10, wherein the threshold distance is based on how closely coincident primitives are modeled relative to a common surface they share.

17. The method of claim 16, wherein the threshold distance is also based on a slope of the perspective of an image presented to the observer on the electronic display.

18. A method for rendering computer graphics for an electronic display, comprising:

receiving an input primitive in the same coincident group as a corresponding primitive stored in a frame buffer;

determining whether the input primitive is within a threshold distance from the stored primitive;

determining which of the input primitive and stored primitive is closer in depth to an observer of the electronic display when the input primitive and the stored primitive are not within the threshold distance;

determining which of the input primitive and stored primitive has a higher priority when the input primitive and the stored primitive are within the threshold distance; and outputting the closer primitive or the primitive with the higher priority to the frame buffer.

19. The method of claim 18, wherein the threshold distance is based on how closely coincident primitives are modeled relative to a common surface they share.

20. The method of claim 18, wherein outputting a primitive to the frame buffer comprises restoring the original contents of the frame buffer or updating at least one of color, depth, group, and layer information of the primitive.

* * * * *